M. SCHNABEL.
ELASTIC WHEEL.
APPLICATION FILED DEC. 24, 1908.
938,901.
Patented Nov. 2, 1909.
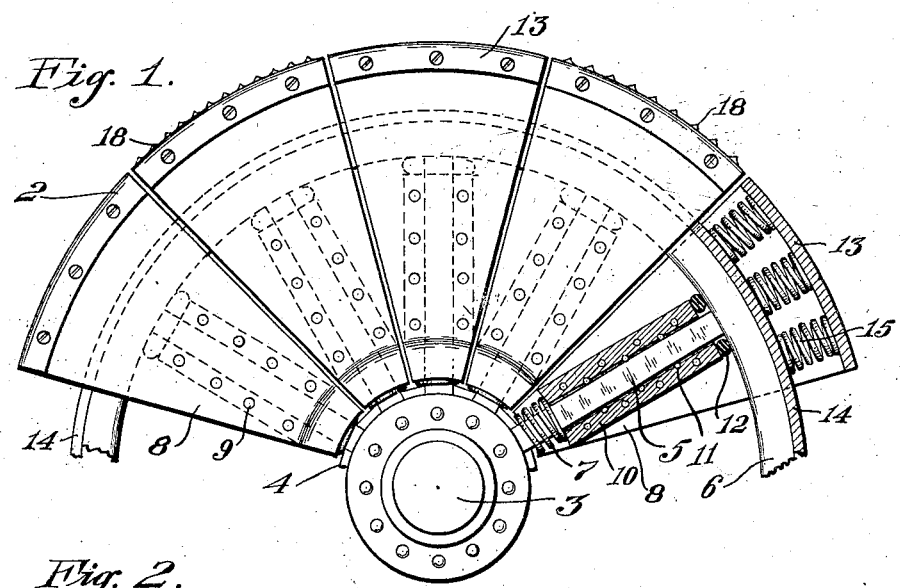
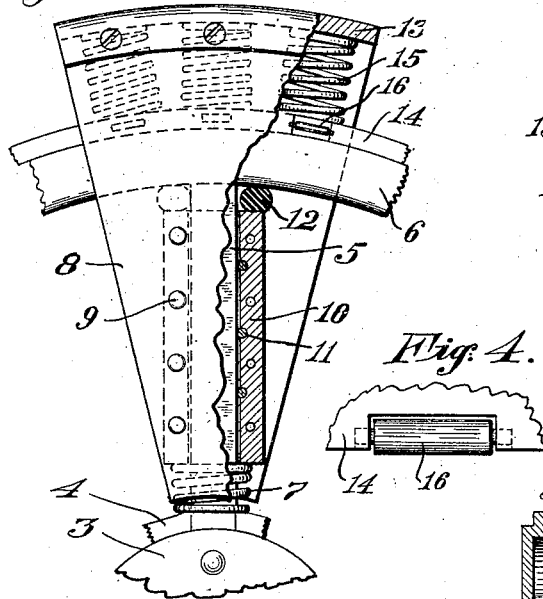
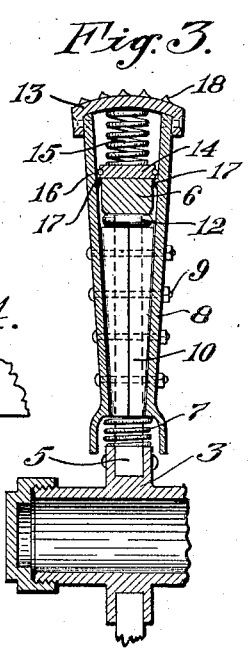
WITNESSES:
INVENTOR
MARTIN SCHNABEL
BY
HIS ATTORNEY

UNITED STATES PATENT OFFICE.

MARTIN SCHNABEL, OF NEWCASTLE, CALIFORNIA.

ELASTIC WHEEL.

938,901.	Specification of Letters Patent.	Patented Nov. 2, 1909.

Application filed December 24, 1908. Serial No. 469,111.

*To all whom it may concern:*

Be it known that I, MARTIN SCHNABEL, a citizen of the United States, residing at Newcastle, in the county of Placer and State of California, have invented new and useful Improvements in Elastic Wheels, of which the following is a specification.

This invention relates to improvements in elastic wheels for automobiles or other vehicles, and it is the purpose of my invention to devise a wheel having sufficient elasticity to permit its being substituted in place of the ordinary pneumatic tired wheel.

A further purpose is to provide a wheel of this class that will be simple in construction, and in which the several parts are readily accessible so that in case of injury or breakage of any of the elements it will only be necessary to remove a portion of the wheel structure to repair the defect.

My invention relates to the parts and the construction and combination of parts, or their equivalents, as set forth in the accompanying specification and drawings, in which—

Figure 1 is a side elevation of a portion of a wheel. Fig. 2 is an enlarged side elevation of the spoke members, partially in section. Fig. 3 is a vertical transverse section through a portion of the wheel.

It is desirable to construct a wheel 2, which will have the same or approximately the same cushion-like or resilient effect that the ordinary pneumatic tire affords, and in the construction of my invention as embodied in the accompanying drawings, I provide a central hub member 3 having a plurality of facets 4 upon its periphery, preferably disposed at right angles to the radii and the spokes 5. These spokes are rigidly inserted in the hub member 3, are preferably polygonal in cross-section and project outwardly from the hub, being secured at their outer ends in a felly 6.

Approximate to the hub 3, and surrounding the spoke 5, is a stiff coiled spring 7 outwardly abutting against the inner ends of boxes 10 formed upon the inner sides of segments 8; the central portions of which are perforated, and slidably mounted upon the spokes 5. Preferably the segments 8 are made in two similar parts, which may be bolted together as at 9 so as to snugly though slidably inclose the spokes 5.

The boxes 10 are provided with antifriction rollers 11 for reducing the frictional resistance as the segments reciprocate along the spokes; and the outer end of the box is prevented from direct contact with the felly 6 by means of any suitable resilient member, such for instance as shown by the rubber pad 12. Thus, it will be seen that the spring 7 will thrust the box outwardly against the cushion 12, which in turn is supported by the felly 6.

As seen in Fig. 3, the segments 8 are extended outwardly past the felly 6, and have removably secured at their outer ends tread-plates or shoes 13, and between these shoes 13 and the metallic band 14 which surrounds the felly 6, are placed a series of coiled springs 15, and which springs afford the resiliency required of the wheel; each of the segments sliding radially upon their respective spokes as the wheel revolves. In order to reduce the friction of the sides 8 of the segments against the band 14, suitable anti-friction rollers 16 may be inserted at intervals around the edge of the rim and adapted to support the segments 8 against transverse motion. For the purpose of insuring a limited amount of outward motion of the several segments 8, due to the action of the springs 7, and to maintain the shoes 13 in an approximately true circle, the inner sides of the segments 8 are provided with small projections 17 which engage with the inner surface of the band 14. When desirable the shoes 13 of several of the segments 8 may be provided with a roughened surface as at 18 to prevent skidding of the wheel. Since the wheel 2 is thus composed of a series of independent segmental tire or shoe members 13, it is obvious that some of these shoes, or the segments, may be quickly removed, and others having roughened surfaces readily placed in the wheel, and it is then in perfect condition for use upon wet and slippery streets.

Obviously this wheel offers a simple, cheap and reliable structure, possessing the desired resiliency, and obviates the use of soft, easily injured tires, and is readily adaptable to meet the various requirements of road surfaces.

Having thus described my invention, what I claim and desire to secure by Letters Patent is—

1. In a vehicle wheel, the combination of a hub-portion, a series of spokes radiating therefrom, a plurality of independent segments having boxes upon their inner sides adapted to slidably embrace the spokes, means for fixing the segments to each other, a felly upon the outer ends of the spoke said segments being extended outwardly past the felly and having tread plates upon their outer ends, and springs between the tread plates and the felly.

2. In a vehicle wheel, the combination of a hub portion, spokes radiating therefrom, a felly in which the outer ends of said spokes are secured, segments reciprocable on said spokes, said segments being made in two similar parts secured together, the inner sides of the segments being formed with inwardly projecting boxes adapted to receive the spokes, said segments being extended outwardly beyond the felly, a removable tread-plate secured to the outer ends of the segments, and a spring between the tread-plate and the felly.

3. In a vehicle wheel, the combination of a hub-portion, spokes radiating therefrom, a felly in which the outer ends of said spokes are secured, the segments reciprocable on said spokes, said segments being made in two similar parts secured together, the inner sides of the segments being formed with inwardly projecting boxes adapted to receive the spokes, said segments being extended outwardly beyond the felly, a removable tread-plate secured to the outer ends of the segments, a spring between the tread-plate and the felly, and resilient members disposed around the spokes and adapted to support said segments between the felly and said hub portion.

4. In a vehicle wheel, the combination of a hub portion, a felly, spokes extending between the hub portion and the felly and a pair of segments for each spoke, said segments being formed of two similar parts, adapted to be secured together, each of said parts having inwardly projecting boxes upon the inner sides, said boxes adapted to receive the spokes and said boxes being of less length than the length of said spokes, resilient supports at the opposite ends of the boxes and disposed around said spokes, said segments being extended beyond said felly, a removable tread-plate connecting the outer ends of each pair of segments, and a resilient support between the felly and the inner surface of the tread-plate.

5. In a vehicle wheel, the combination of a hub portion, a felly, spokes extending between the hub portion and the felly a pair of segments for each spoke, said segments being formed of two similar parts, adapted to be secured together, each of said parts having inwardly projecting boxes upon the inner sides, said boxes adapted to receive the spokes and said boxes being of less length than the length of said spokes, resilient supports at the opposite ends of the boxes and disposed around said spokes, said segments being extended beyond said felly, a removable tread-plate connecting the outer ends of each pair of segments, and a resilient support between the felly and the inner surface of the tread-plate, said boxes having anti-friction rollers to contact with the spokes.

In testimony whereof I have hereunto set my hand in presence of two subscribing witnesses.

MARTIN SCHNABEL.

Witnesses:
   CHRIS. P. JOHNSON,
   T. W. BLAIR.